(12) United States Patent
Achter

(10) Patent No.: US 7,802,114 B2
(45) Date of Patent: Sep. 21, 2010

(54) STATE CHANGE SENSING

(75) Inventor: Michael Achter, Mountain View, CA (US)

(73) Assignee: Spansion LLC, Sunnyvale, CA (US)

( * ) Notice: Subject to any disclaimer, the term of this patent is extended or adjusted under 35 U.S.C. 154(b) by 691 days.

(21) Appl. No.: 11/687,487

(22) Filed: Mar. 16, 2007

(65) Prior Publication Data

US 2008/0229122 A1 Sep. 18, 2008

(51) Int. Cl.
*G06F 1/26* (2006.01)
*G11C 7/00* (2006.01)

(52) U.S. Cl. ............... 713/300; 365/226; 365/189.011; 713/320

(58) Field of Classification Search .......... 713/300, 713/320; 365/226, 189.011
See application file for complete search history.

(56) References Cited

U.S. PATENT DOCUMENTS

| | | | | |
|---|---|---|---|---|
| 4,218,647 A | * | 8/1980 | Haas | 323/268 |
| 4,908,799 A | * | 3/1990 | Gaudronneau | 365/185.23 |
| 5,450,426 A | * | 9/1995 | Purdham et al. | 714/820 |
| 5,668,752 A | * | 9/1997 | Hashimoto | 365/104 |
| 6,119,245 A | * | 9/2000 | Hiratsuka | 714/7 |
| 6,561,046 B1 | * | 5/2003 | Taylor et al. | 73/863.23 |
| 6,608,790 B2 | * | 8/2003 | Tran et al. | 365/211 |
| 7,050,334 B2 | * | 5/2006 | Kim et al. | 365/185.28 |
| 7,082,510 B2 | * | 7/2006 | Yamagami et al. | 711/200 |
| 7,200,469 B2 | * | 4/2007 | Katrak et al. | 701/1 |
| 7,200,524 B2 | * | 4/2007 | Kang et al. | 702/183 |
| 7,324,398 B2 | * | 1/2008 | Shim et al. | 365/212 |
| 7,379,338 B2 | * | 5/2008 | Frulio et al. | 365/185.18 |
| 7,391,638 B2 | * | 6/2008 | Fasoli et al. | 365/105 |
| 2002/0030538 A1 | * | 3/2002 | Morishita | 327/541 |
| 2002/0095545 A1 | * | 7/2002 | Dalvi et al. | 711/103 |
| 2002/0122334 A1 | * | 9/2002 | Lee et al. | 365/185.23 |
| 2003/0221070 A1 | * | 11/2003 | Minowa et al. | 711/147 |
| 2005/0024954 A1 | * | 2/2005 | Dalvi et al. | 365/199 |
| 2005/0273611 A1 | * | 12/2005 | Yoshimura | 713/176 |
| 2006/0077742 A1 | * | 4/2006 | Shim et al. | 365/222 |
| 2007/0088869 A1 | * | 4/2007 | Kadota | 710/36 |
| 2007/0088974 A1 | * | 4/2007 | Chandwani et al. | 714/6 |
| 2007/0174642 A1 | * | 7/2007 | Cornwell et al. | 713/300 |
| 2007/0179727 A1 | * | 8/2007 | Gross et al. | 702/76 |
| 2007/0189078 A1 | * | 8/2007 | Taito et al. | 365/185.24 |
| 2007/0242549 A1 | * | 10/2007 | Klostermann et al. | 365/226 |
| 2008/0034337 A1 | * | 2/2008 | Kuemerle et al. | 716/6 |
| 2008/0079442 A1 | * | 4/2008 | Posamentier | 324/605 |
| 2008/0089141 A1 | * | 4/2008 | Nandi | 365/189.09 |
| 2008/0091770 A1 | * | 4/2008 | Petras et al. | 709/203 |
| 2009/0077393 A1 | * | 3/2009 | Nakamura | 713/310 |
| 2009/0122586 A1 | * | 5/2009 | Ivanov et al. | 365/51 |
| 2009/0296489 A1 | * | 12/2009 | Cernea | 365/185.21 |

* cited by examiner

*Primary Examiner*—Thomas Lee
*Assistant Examiner*—Zahid Choudhury
(74) *Attorney, Agent, or Firm*—Turocy & Watson, LLP

(57) ABSTRACT

Application of too much voltage to a memory cell will cause damage to the cell or even destroy the cell. Tracking current that arises from an application of voltage upon a memory cell allows for minimization of damage upon the memory cell. If there is a change in current, then the voltage application can be accordingly changed.

18 Claims, 14 Drawing Sheets

STATE CHANGE SENSING

TECHNICAL FIELD

The subject specification relates generally to voltage application and in particular to sensing current from a voltage application upon a memory cell.

BACKGROUND

Recent developments have taken place regarding storage of information in a digital format. Storing information in a digital format includes storing individual bits of information as an 'I' (e.g., a high state) or as an 'O' (e.g., a low state). This type of information storage permeates many applications including photography, interpersonal communication, music recording, as well as others. Various memory types exist to digitally store information with different characteristics. These memory types have different characteristics that make them applicable for different types of applications. For example, a memory type that cannot be re-written can be beneficial for data that is necessary for a system to operate properly. This provides a greater likelihood that the information will be available when needed by the system.

One specific development is the introduction of flash memory technology. Flash memory is a memory type that is readable, re-writeable, and non-volatile. In addition, many flash memory devices are small and portable. This allows for usage of flash memory in an array of personal applications. A common flash memory device can be accessed by an array of different electronic devices, where electronic devices likely read information stored on flash memory device. The ability to re-write to flash memory allows a user to use the memory as temporary storage location. For example, a user can store a photograph in a flash memory device and transfer the photograph to a desktop computer. Once the transfer is complete, the user can store to cells that were previously used. In addition, flash memory is easily transportable since it does not need a constant source of power to retain memory.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

Application of excessive voltage to a memory cell can cause damage to the cell or destroy the cell. Therefore, the subject specification allows for sensing current that results from the application of voltage upon the memory cell. Based on current, a sensor component can determine the state of the cell and if the voltage applied to the memory cell is at a dangerous level. Based on determinations by the sensor component, the application of voltage can be stopped before there is damage to the memory cell.

In addition, the subject specification allows for improved operation of a flash memory device. Since there is tracking of the current that is produced from a state change, voltage application can be changed in real time to allow for optimal memory cell manipulation. If the current of a cell is dropping, then there can be an increase in voltage upon the memory cell to allow for a faster state change if an increased voltage level will not damage the memory cell.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
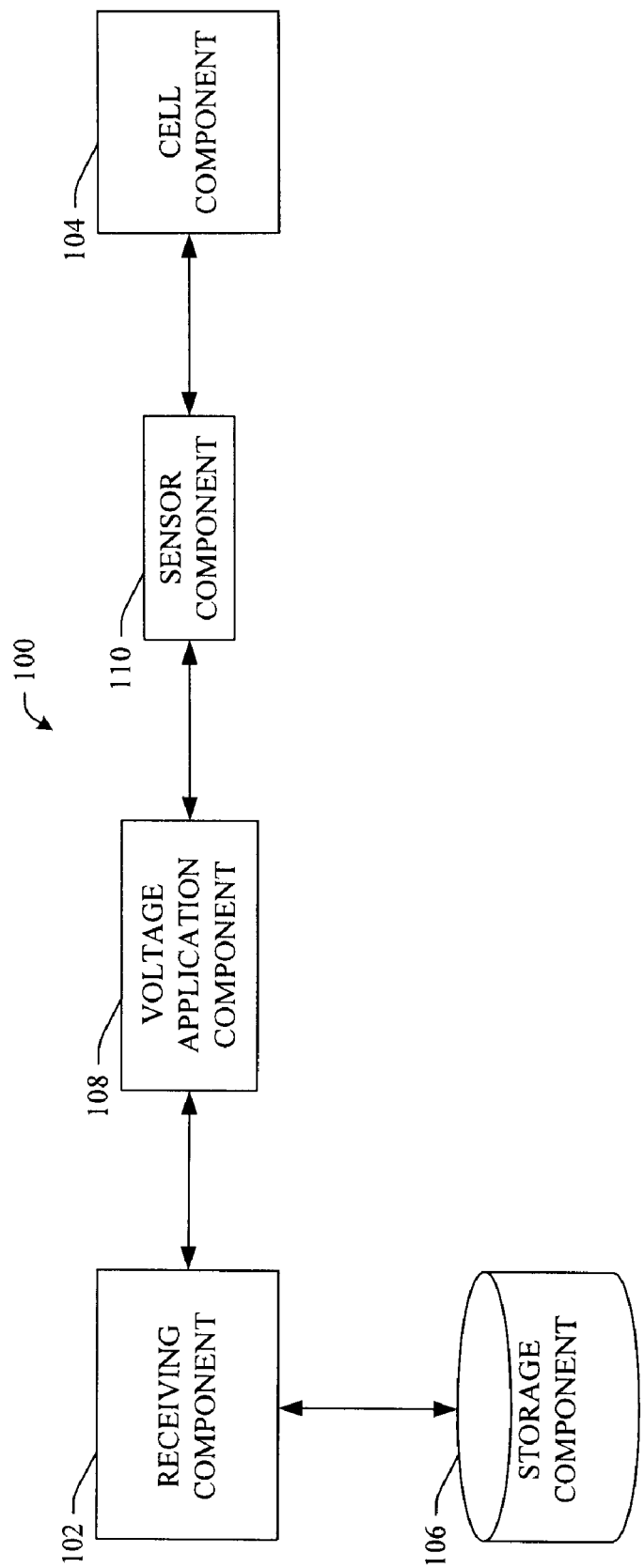
FIG. 1 illustrates a representative flash memory device in accordance with an aspect of a subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components. The designation 'I' and '1' can be used to signify a high logical state and are to be used interchangeably. The designation 'O' and '0' can be used to signify a low logical state and are to be used interchangeably.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 discloses an example partial flash memory device 100. A receiving component 102 obtains a command to alter a state of a cell component 104. The command can originate from a number of different locations. In one embodiment, the flash memory device 100 communicates with an auxiliary device (e.g., a cellular telephone). For example, the auxiliary device requests that information be stored in the cell component 104. The receiving component 102 can process a request and identify a cell component 104 in which to store information. Information disclosed in the subject specification can apply for erasing a cell component, programming a cell component, as well as for other state change types.

In another embodiment, the receiving component 102 receives requests from within the flash memory device 100 to change the state of the cell component 104. For example, the flash memory device 100 can configure to erase information if it has not been accessed in a specific period (e.g., the information has not been accessed in twenty-four months). A command can arrive from another portion of the flash memory device 100 to erase information after the specific period. In a further embodiment, the receiving component 102 can communicate wirelessly to receive commands for state changes on the cell component 104.

A storage component 106 operates to keep a record of various activities that take place with regard to the flash memory device 100. For example, each time a command is received by the receiving component 102, the storage component 106 can create a record of the command. The storage component 106 can also make comparisons based on information concerning the request and execution of the request. Records of comparisons can also be saved in the storage component 106. Furthermore, the storage component 106 can keep records about a voltage application component 108, sensor component 110, and/or cell component 104.

A voltage application component 108 places a voltage upon the cell component 104. Application of a voltage upon the cell component 104 includes applying a current to the cell component 104. A sensor component 110 can constantly determine what current is passing through it, which is representative of the voltage applied to the cell component 104 and how the cell component 104 is reacting to the application of current. This allows for a verification voltage and a state-change voltage to take place at the same time.

In another embodiment, the sensor component 110 only takes samples of the current passing through it as opposed to constantly determining the current. For example, the sensor component 110 can takes samples at a specific increment of time (e.g., every nanosecond). In another example, the sensor component 110 performs intelligent sampling of current. The sensor component 110 can increase or decrease the duration between samples taken based on the results of a sample. If the current is at a level that is near a state change for the cell component 104, then the sensor component 110 can increase the amount of samples taken.

The sensor component 110 can have several capabilities toward regulating operation of the flash memory device 100 and in turn the voltage application component 108. In one embodiment, the sensor component 110 has the capability of stopping a voltage application. For example, the sensor component 110 can determine that the cell component 104 has changed states and the application of any more voltage could cause damage to the cell component 104. Therefore, the sensor component 110 stops voltage application. Regulating can be considered any action the sensor component takes in response to a sensed current and/or voltage. For example, regulating can be forcing the voltage application component 108 to stop providing voltage. In another example, regulating can be informing the voltage application component 108 as to the status of voltage application without forcing an action.

In another embodiment, the sensor component 110 regulates operation by sending a message to the voltage application component 108. For example, the sensor component 110 can determine that the state of the cell component 104 has changed and application of any more voltage could cause damage to the cell component 104. The sensor component 110 can send a message to the voltage application component 108 advising that voltage application should stop. However, the voltage application component 108 ultimately determines when to stop voltage application.

In a further embodiment, the sensor component 110 can communicate with the storage component 106. The characteristics of voltage application upon the cell component 104 can be saved in the storage component 106. For example, the rate in which the state changes in the cell component 104 can be determined by the sensor component 110. The sensor component 110 can keep a record of this and store the record in the storage component 106.

In operation, voltage is applied to the charge-holding component to change a state of the cell component 104. The sensor component 110 determines current that passes through it to detect the state of the charge-holding component. For example, one Amp can initially pass through the sensor component 110. However, as the state of the cell changes, current can switch to two Amps. The sensor component 110 can sense the change and have internal logic to determine how to proceed.

Under Ohm's law, current is equal to voltage over resistance. Voltage is known because it is supplied from the voltage application component 508 and this information can be accessed by the sensor component 510. The sensor component 508 determines the current traveling to the cell component 504. With the voltage and current known, the resistance can be determined of the cell component 504. Resistance can relate to a state of the cell component. The sensor component 510 can reference the storage component to determine what resistance equals what state (e.g., 1-Ohm equals '0010'). The sensor component 510 can communicate with the voltage application component 508 with appropriate information.

In one embodiment, a rise in current can mean the cell is almost complete with a state change. Therefore, the sensor component 110 instructs the voltage application component 106 to lower or stop voltage supply. In another embodiment, a rise in current can mean more voltage should be applied to the cell component. Therefore, the sensor component 110 instructs the voltage application component to increase the voltage supply. The sensor component 110 can specifically tell the voltage application component 108 what voltage to supply. However, the sensor component 110 can instruct the voltage application component 108 to increase the voltage without a recommendation as to what voltage to apply.

The subject specification allows for state changing without switching between a verification and state changing. Performing the switch uses a lot of overhead and draws a large amount of system resources. This allows for operation in real time. This can take place for operations other than changing the state of a cell component in flash memory. For example, information in the subject specification can apply to charging a capacitor. Therefore, a cell component represents any component that can react to a voltage application. A cell component includes a memory cell.

Figure 2:
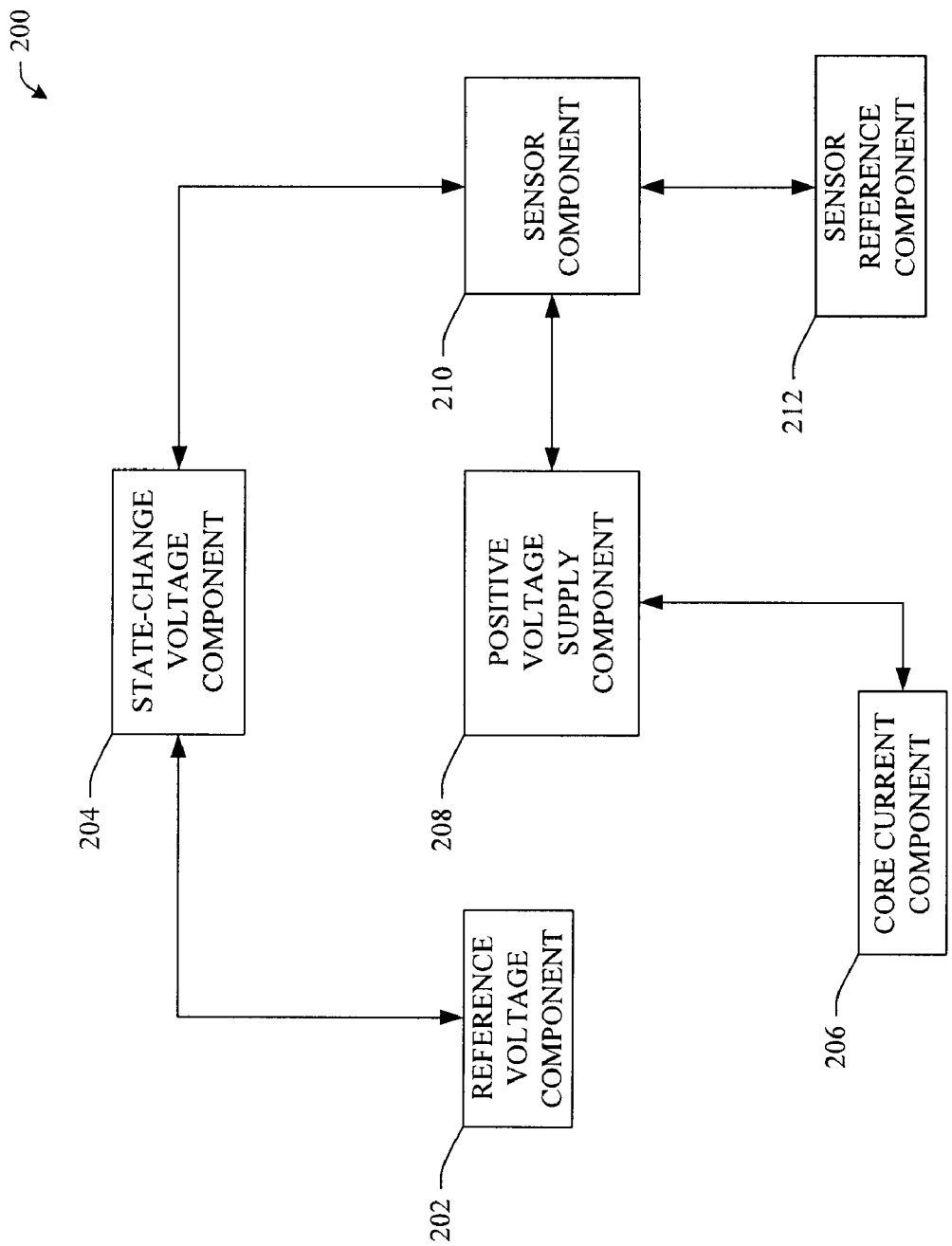
FIG. 2 illustrates a representative drain-side sensing configuration in accordance with an aspect of a subject specification.

FIG. 2 discloses an example drain-side sensing configuration 200. A reference voltage component 202 and a state change voltage component 204 allow for a state change to take place on a cell component. A core current component 206 produces a current that allows the configuration to operate. A positive voltage supply component 208 allows a sensor component 210 to operate (e.g., supplies power to the sensor component). A sensor reference component 212 gives a base in which a sensor component 210 can use in determining a state of a cell component. The sensor component 210 can be similar to or the same as the sensor component 110 of FIG. 1.

In the displayed configuration, a relationship should be known between a verify/read level and a state change current. This allows the sensor component 210 to know the difference between a state change voltage application and a read voltage application. In addition, the configuration 200 can use a fixed, stepped, or ramped gain and a fixed, stepped, or ramped drain. Use of this configuration can eliminate a verify/state-change/verify sequence and instead have verification take place during a state-change. Core current could be higher during a state-change, but it could average out with a faster state-change speed.

Figure 3:
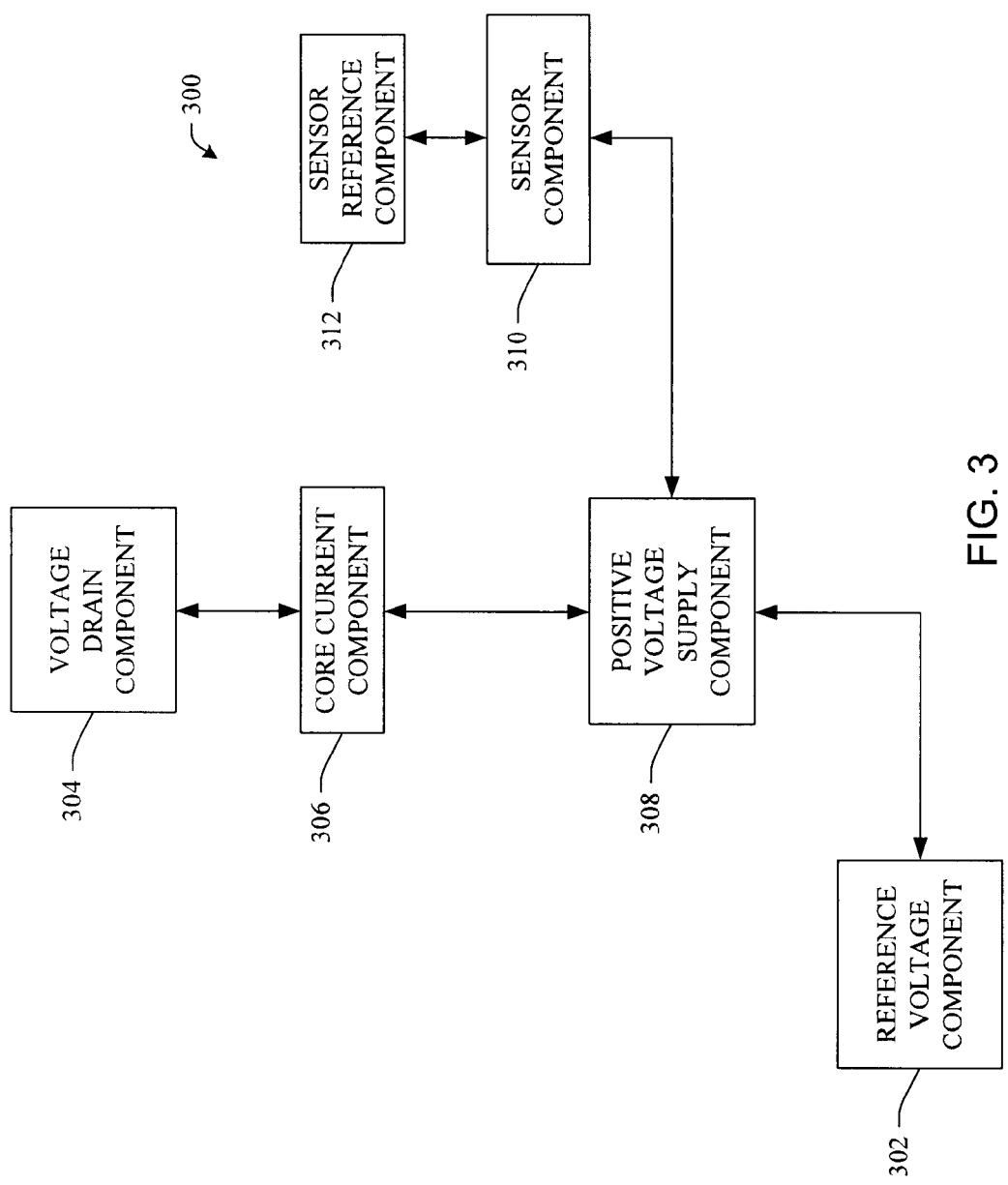
FIG. 3 illustrates a representative source-side sensing configuration in accordance with an aspect of a subject specification.

FIG. 3 discloses an example source-side sensing configuration 300. A reference voltage component 302 gives the configuration 300 a reference to use during operation. A voltage drain component 304 and core current component connect 306 to a positive voltage supply component 308 to provide power to the sensor component 310. A sensor reference component 312 gives a base in which a sensor component 310 can use in determining a state of a cell component. The sensor component 310 can be similar to or the same as the sensor component 110 of FIG. 1.

In the displayed configuration, a relationship should be known between a verify/read level and a state change current. This allows the sensor component 310 to know the difference between a state-change voltage application and a read voltage application. In addition, the configuration 300 can use a fixed, stepped, or ramped gain and a fixed, stepped, or ramped drain. Use of this configuration can eliminate a verify/state-change/verify sequence and instead have verification take place during a state-change. Core current could be higher during a state-change, but it could average out with a faster state-change speed.

Figure 4:
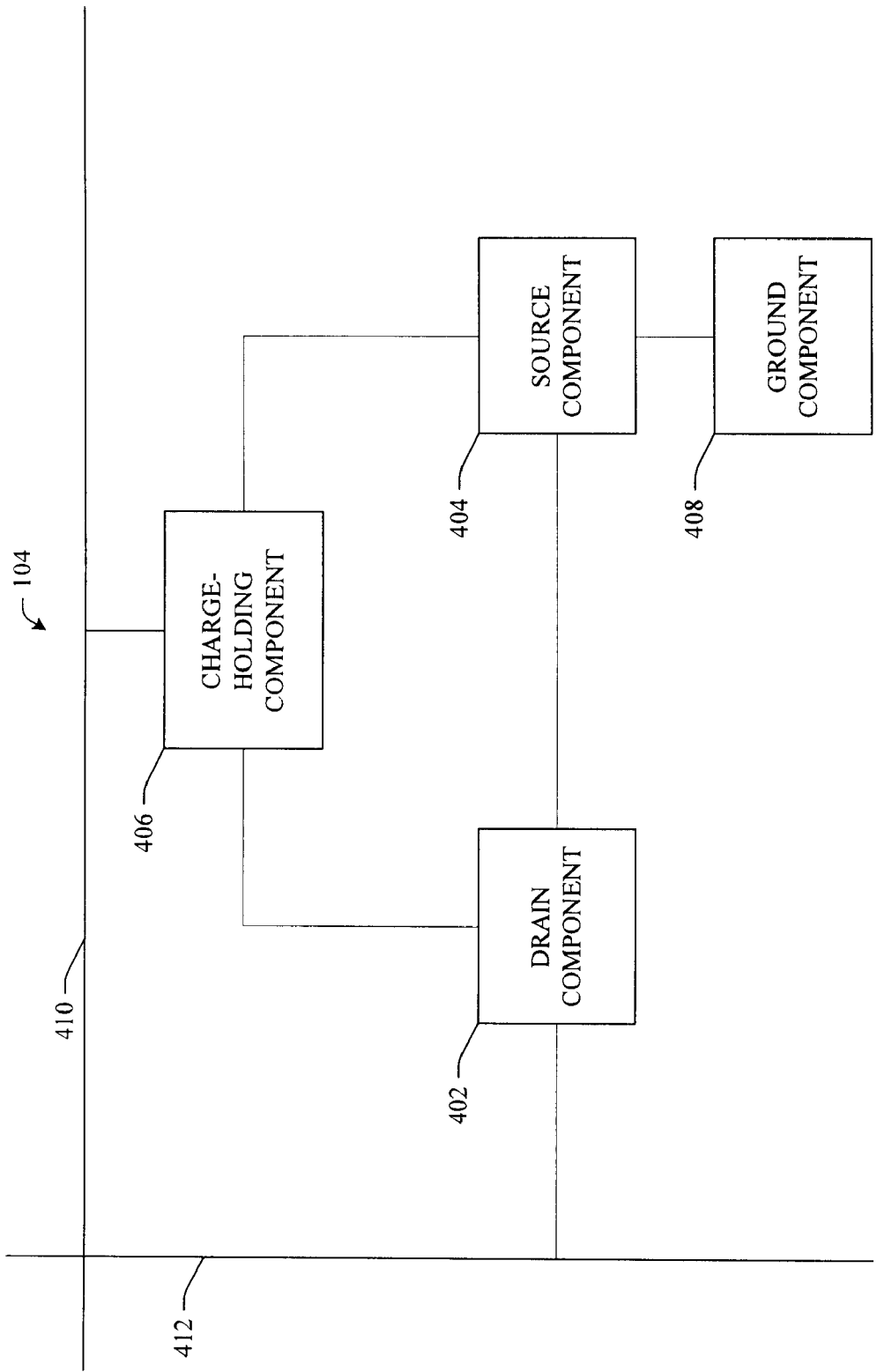
FIG. 4 illustrates a representative cell component in accordance with an aspect of a subject specification.

FIG. 4 illustrates an example cell component 104. Voltages applied by a voltage application component 106 of FIG. 1 can apply to either a drain component 402 or a source component 404. A sensor component 110 of FIG. 1 can use a configuration 200 of FIG. 2 to sense current off the drain component 402. A sensor component 110 of FIG. 1 can use a configuration 300 of FIG. 3 to sense current off the source component 404. A charge-holding component 406 includes the capability of having a state (e.g., storing at least one bit of information). The cell component 104 is grounded through a ground component 408. In addition, a wordline 410 and a bitline 412 assist in holding information.

Figure 5:
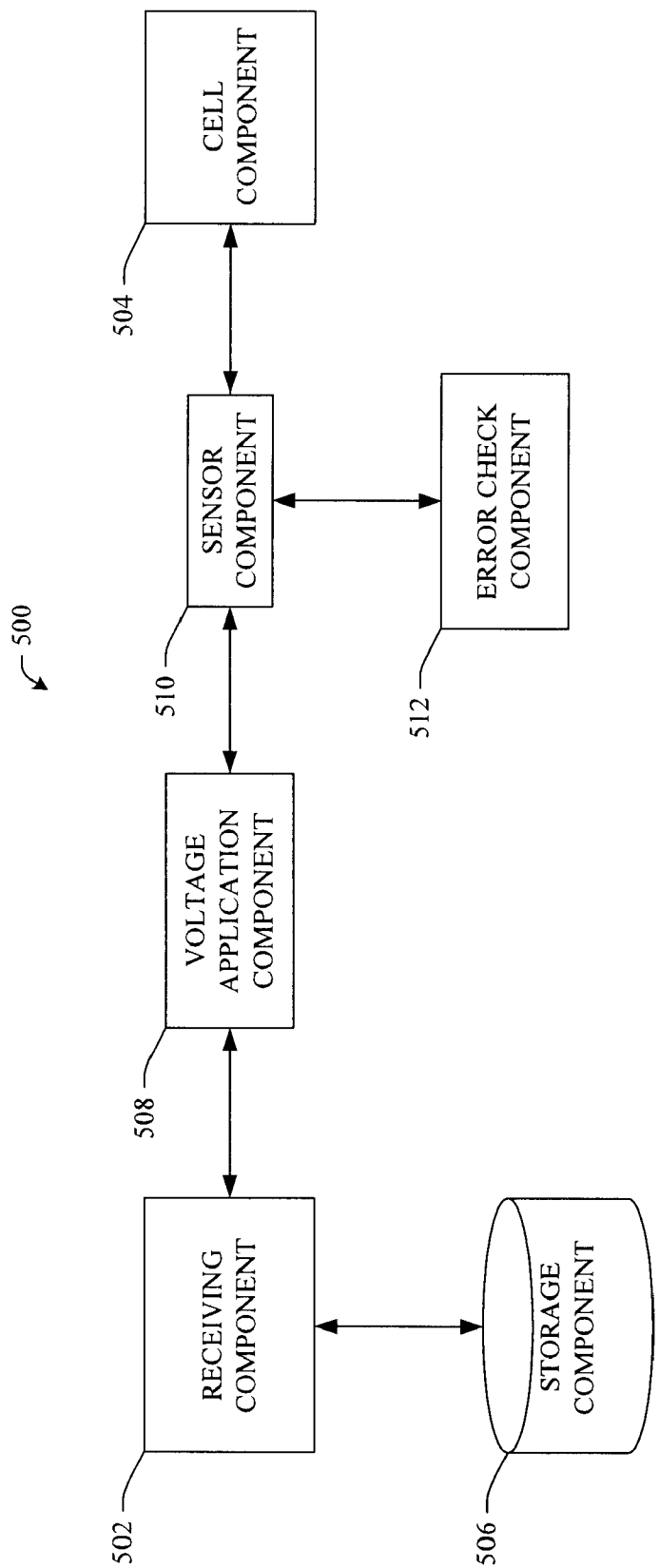
FIG. 5 illustrates a representative flash memory device with an error check component in accordance with an aspect of a subject specification.

FIG. 5 discloses an example partial flash memory device 500. A receiving component 502 gathers commands to change the state of a cell component 504. Information relating to commands can be stored in a storage component 506. A voltage application component 508 applies voltage to the cell component 504 to alter the state of the cell component 504. For example, the cell component 504 can have a state of '0000' and voltage can be applied to change the state to '0011'. A sensor component 510 reads current information about the application of voltage to the cell component and determines what voltage should apply.

An error check component 512 can process errors found in the flash memory device 500. Processing errors can entail a variety of actions. For example, the error check component 512 can attempt to correct errors that take place concerning the flash memory device 500. In another example, the error check component 512 can simply identify the errors and store error information in the storage component 506. In a further example, the error check component can attempt to determine why an error took place without actually correcting the error. This information can be communicated with an auxiliary device. It is to be appreciated that the error check component can process errors found in components in other portions of the subject specification.

In one embodiment, the error check component 512 performs checks relating to the receiving component 502. For example, the receiving component 502 cannot accept commands from remote locations (e.g., a wireless device sending an instruction to the receiving component). The error check component can store a record of this error in the storage component 506. Later, an auxiliary diagnostic system can access the records of the storage location 506 and attempt to correct and listed errors.

In another embodiment, the error check component 512 performs checks relating to the storage component 506. For example, the storage component 506 can be deleting information if it has not been accessed in a certain amount of time (e.g., one month). However, there is no instruction for the storage component 506 to operate in this manner. Therefore, this would be an improper action by the storage component 506. The error check component 512 can attempt to stop the storage component 506 from deleting information when it should not delete information.

In a further embodiment, the error check component 512 performs checks relating to the voltage application component 508. The error check component 512 can hold information on what standard voltages should be applied to the cell component 504. The voltage application component 508 can attempt to apply a voltage that is well beyond normal limits. The error check component 512 can identify that the voltage level is not within normal limits and stop the application from taking place. This can be beneficial because the application of a wrong voltage can damage or destroy the cell component 504.

In yet another embodiment, the error check component 512 performs checks relating to the sensor component 510. For example, the sensor component 510 can malfunction and not correctly sense current or not sense current at all. The error check component 512 can act as a secondary sensor component and attempt to make sure the cell component 504 is not damaged if the sensor component 510 fails. In addition, the error component can instruct a shutdown of the voltage application component 508 if the sensor component is in error.

In yet a further embodiment, the error check component 512 performs checks relating to the cell component 504. For example, the cell component 504 can provide inconsistent reaction to the application of voltage. This can lead to a misread by the sensor component 510 and ultimately lead to damage to the cell component 504. The error check component 512 can identify the error of the cell component 504 and attempt to protect the cell component 504 from damage.

Figure 6:
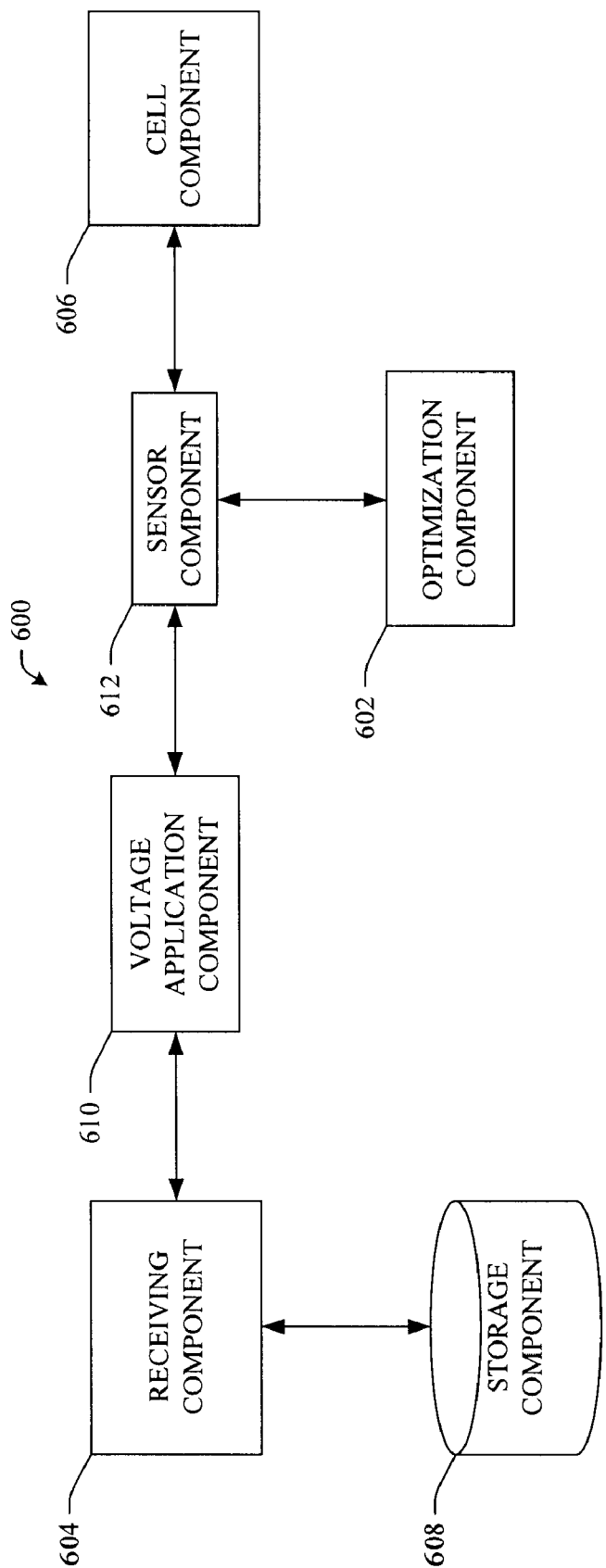
FIG. 6 illustrates a representative flash memory device with an optimization component in accordance with an aspect of a subject specification.

FIG. 6 discloses an example partial flash memory device 600 with optimization component 602. A receiving component 604 obtains instructions to change a state of a cell component 606. Information relating to a state change can be stored in a storage component 608. For example, the storage component 608 can hold information as to how long it takes to change a cell component 606 state for iterations of a voltage application component 610. The voltage application component 610 applies voltage upon the cell component to change the state of the cell 606. A sensor component 612 has current pass through it and the sensor component 612 makes determinations about the cell component 606 based on the current.

An optimization component 602 operates to allow the flash memory device 600 to operate at full or near-full potential. In one embodiment, the optimization component 602 processes the command received by the receiving component 604. During processing, the optimization component 602 determines what voltages should be applied to the cell component to allow for the fastest state change (e.g., information to allow the voltage application component to operate more efficiently). This can take place by the optimization component 602 observing characteristics of the cell component 606 and making estimations based on a desired state. In general, the optimization component 602 calculates efficiency information. Calculated information is transferred to the voltage application component 610 where the calculated information is implemented. The sensor component 612 can regulate the implementation of calculated information and override voltage application if necessary or desirable.

In another embodiment, the optimization component 602 streamlines operations within the flash memory device. For example, process raw data into a format allowable for storage. This will allow other components to perform other tasks and allow for quicker access to information in the storage component 608.

Figure 7:
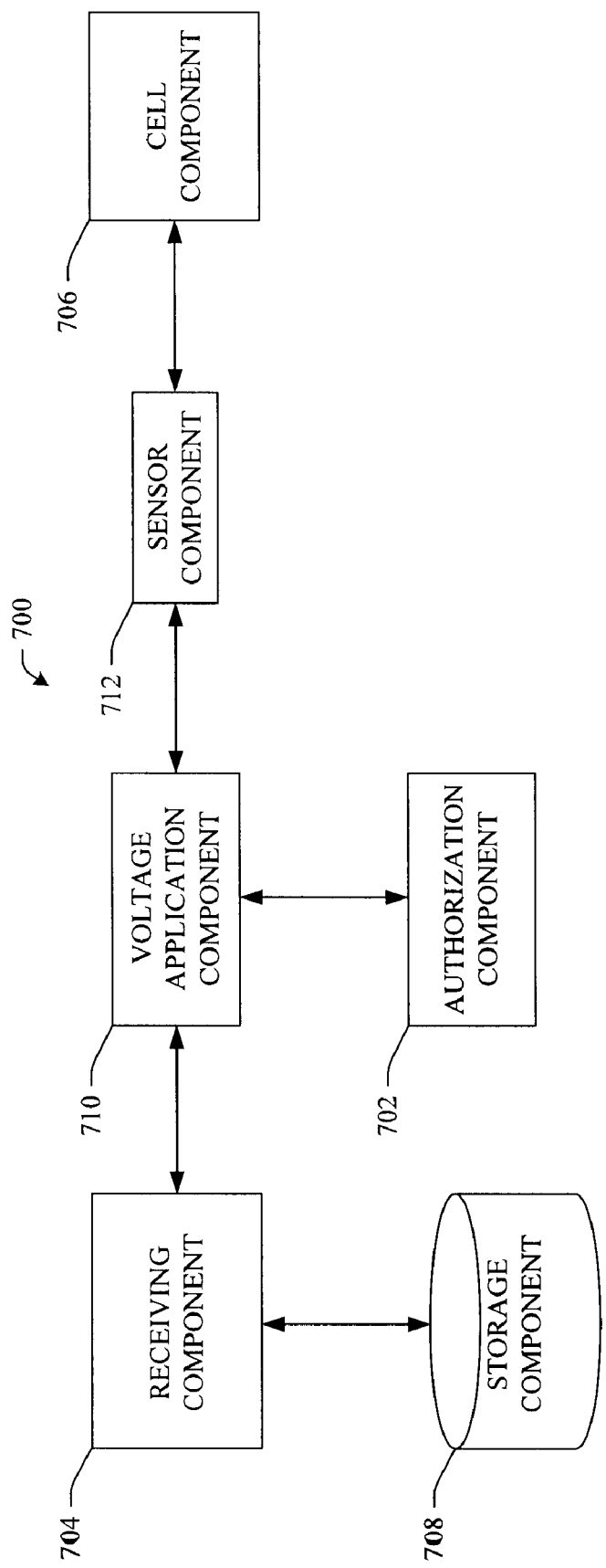
FIG. 7 illustrates a representative flash memory device with an authorization component in accordance with an aspect of a subject specification.

FIG. 7 discloses an example partial flash memory device 700 with an authorization component 702. A receiving component 704 processes a request to alter a state of a cell. Commonly, this is a request to program information onto the cell component 706 or delete information from the cell component 706. A record of the incoming request can be stored on a storage component 708. The receiving component 704 communicates with a voltage application component 710 that the state of a cell component 706 should change.

An authorization component 702 performs a check to determine if the state of the cell component should change. For example, the cell component 706 can contain important information that would cause a detrimental situation if it were to be erased (e.g., a password to access financial records). The authorization component 702 can check to make sure the flash memory device 700 received an authorized request. That can be done in a number of different manners.

In one embodiment, the authorization component 702 can check if a request to change a state came from a specific user. Information on authorized users can be saved on the storage component 708 or it can be saved in internal memory of the authorization component 702. In another embodiment, the authorization component 702 has a password that should be provided before a state change takes place. In a further embodiment, a request contains authentication information that should be checked by the authorization component 702 before a state change takes place on a cell component 706. For each embodiment, the authorization component 702 can reject a request that is considered unauthorized.

Ultimately, the voltage application component 710 applies a voltage upon the cell component 706. The sensor component 712 tracks current from the application of voltage upon the cell component. Based on various parameters, the sensor component 712 can change the amount of voltage applied by the voltage application component 710. For example, if the current is drastically changing, then it could be a sign that the voltage should be stopped. Therefore, the sensor component can stop voltage application upon the cell component 706.

Figure 8:
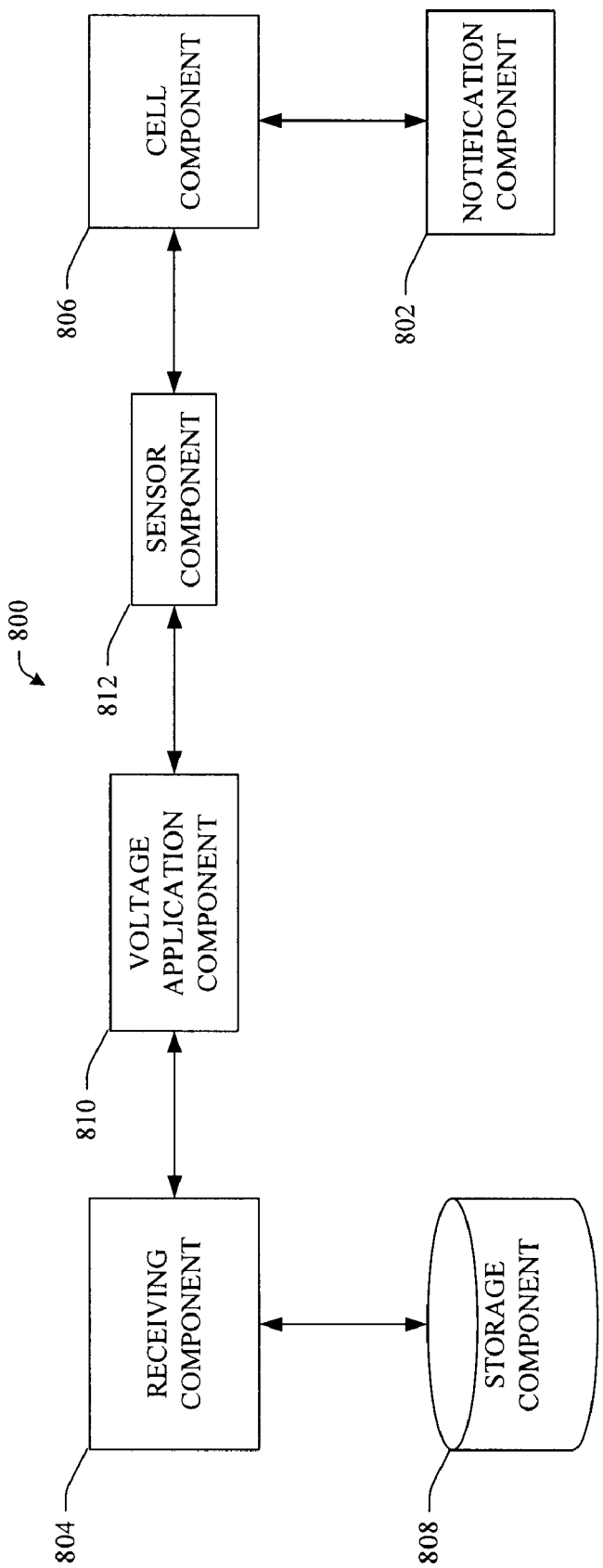
FIG. 8 illustrates a representative flash memory device with a notification component in accordance with an aspect of a subject specification.

FIG. 8 discloses an example partial flash memory device 800 with a notification component 802. A receiving component 804 obtains a request to change the state of a cell component 806. Information about the request can be stored in a storage component 808. A voltage application component 810 applies a voltage to the cell component 806 in accordance with the request received by the receiving component 804. Information about voltage application can be saved in the storage component 808. A sensor component 812 monitors current from the application of voltage upon the cell component 806. Based on the monitoring, the sensor component 812 can regulate voltage application so the cell component 806 does not become damaged or destroyed.

A notification component 802 sends messages about voltage application upon the cell component 806 (e.g., functionality of the flash memory device 800). The notification component 802 can send notices about the displayed components as well as related component within the flash memory device 800. Furthermore, the notification component 802 can send information about devices in conjunction with the flash memory device 800 (e.g., an attached person computer that made the request).

For example, the notification component 802 can compile a report about operations within the flash memory device 800. The report can contain an array of information, ranging from where to request originated to the performance of the sensor component 812 during operation. The report can be stored in the storage component 808 and send out to an auxiliary device.

Figure 9:
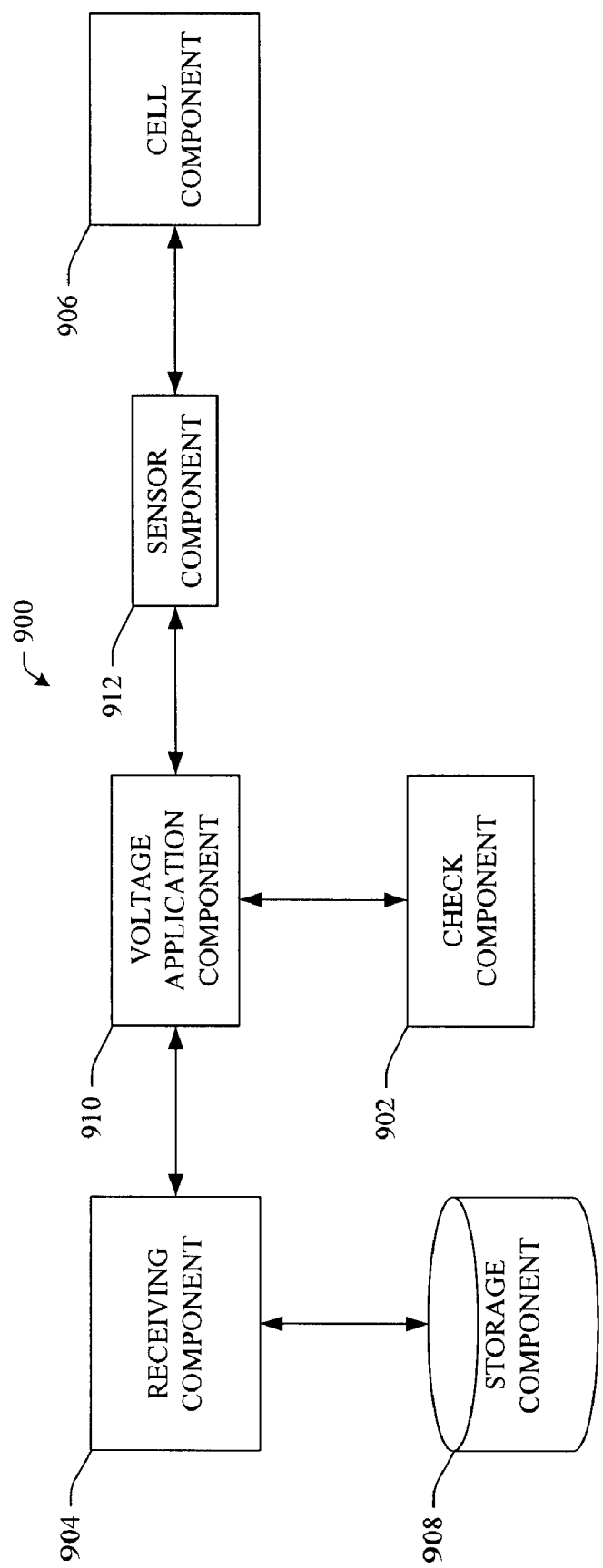
FIG. 9 illustrates a representative flash memory device with a check component in accordance with an aspect of a subject specification.

FIG. 9 discloses an example partial flash memory device 900 with a check component 906. A receiving component 904 processes requests to alter a state of a cell component 906. Processing the request can include identifying a source location and storing the request in a storage component 908. The receiving component 904 can also identify characteristics of the request. For example, a goal time in which a state change should complete. This information can transfer to a voltage application component 910 that applies a state-change voltage upon a cell that produces a current followed by a sensor component 912.

A check component 902 verifies functions within the flash memory device 900. In one embodiment, the check component 902 compares information received in the request (e.g., host system information) with information located in the storage component 908. In another embodiment, the check component 902 can determine if the voltage application component 910 is applying a correct amount of voltage. The check component 902 can make a record of determinations made or attempt to correct inconsistent information. For example, if the voltage application component is applying 10 volts, but request stated 9.98 volts should be used, then the check component 902 can force the voltage application component 910 to apply the proper voltage. In a further embodiment, the check component 902 can request a user to verify a state change request. If the request is not properly verified, then it can be denied.

Figure 10:
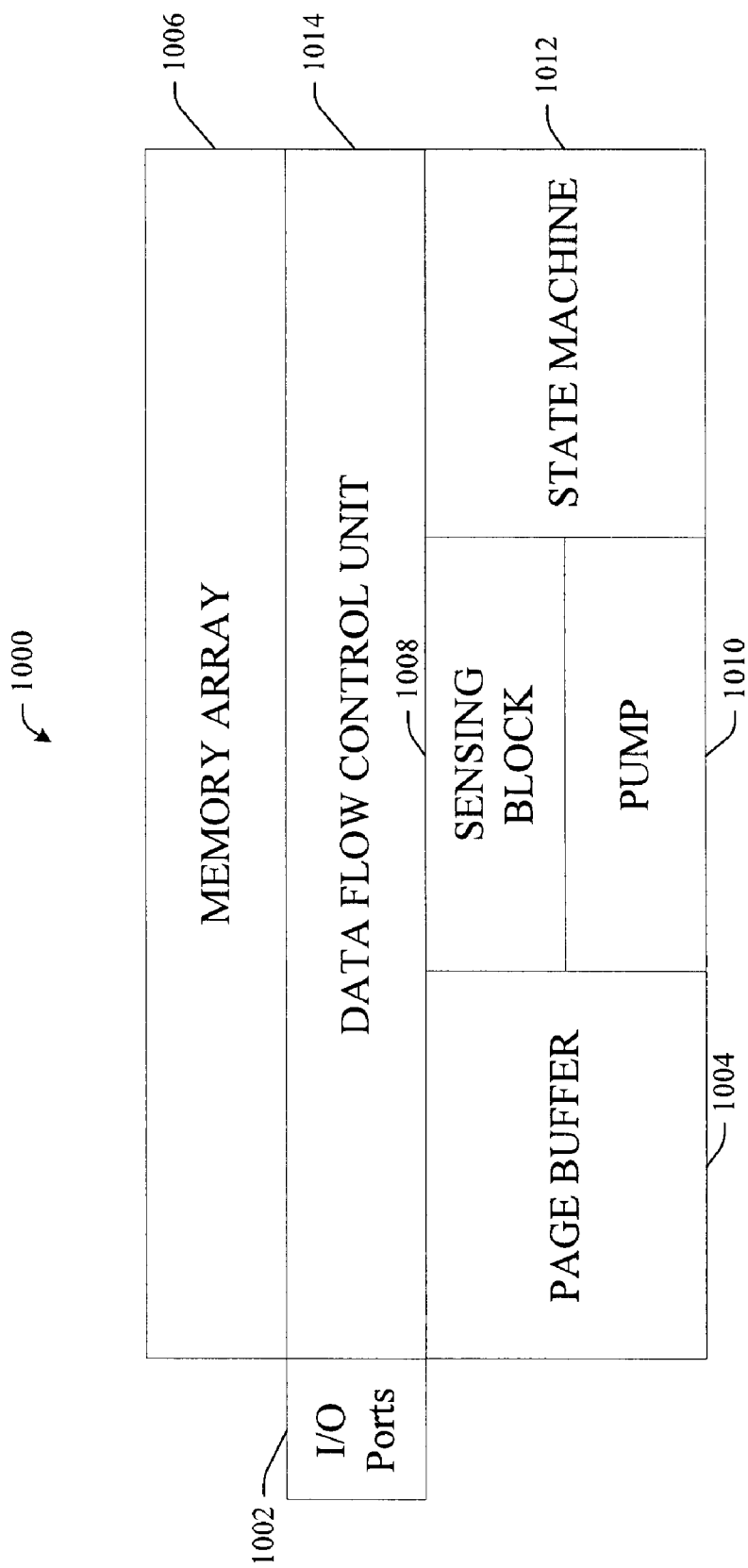
FIG. 10 illustrates a representative flash memory device in accordance with an aspect of the subject specification.

FIG. 10 illustrates an example flash memory device 1000 with components that can integrate with information disclosed in other portions of the subject specification. Same-named components in the subject specification can contain the functionality of one another and components disclosed in the subject specification can integrate together. A flash memory device 1000 has I/O ports 1002 that connect to an electronic device (e.g., a cellular telephone). The I/O port 1002 communicates with the electronic device digitally. The I/O port 1002 can have multiple configurations; for example, individual metal prongs or a universal serial bus (USB) port can be used to communicate with the electronic device. In addition, the I/O port 1002 can contain several components of the subject specification, for example a receiving component 102 of FIG. 1 and/or a notification component 802 of FIG. 8. Power can be supplied to the flash memory device 1000 from the electronic device.

A page buffer 1004 is a temporary placeholder for information, such as an instruction passing from a receiving component 102 of FIG. 1 to a voltage application component 108 of FIG. 1. A common page buffer 1004 employs static random access memory (SRAM). In many flash memory devices 1000, there is a plurality of page buffers 1004 while drawing depicts the plurality as a single page buffer 1004. There can be a scratch-pad buffer 1004 that performs temporary storage and FIG. 10 shows this scratch pad buffer 1004 integrated in the general page buffer 1004.

A memory array 1006 is a storage location for a flash memory device 1000. Cell components disclosed in various parts of the subject specification can form a memory array 1006. Typically, a memory array 1006 comprises a number of individual cell components that can contain information in bits, with typical cells holding one to four bits for information. It is to be appreciated that information of the subject specification can apply to cell components capable of containing more than four bits of information. In one embodiment, various storage components disclosed in the subject specification integrate into the memory array 1006. In another embodiment, storage components disclosed in the subject specification are independent of the memory array 1006 and can be of a different memory type than the memory array 1006.

A sensing block 1008 functions to monitor occurrences that take place within the flash memory device 1000. For example, a sensing block 1008 can determine if a voltage application component disclosed in the subject specification has begun operation. A pump 1010 provides a high voltage for operations that require such a voltage. For example, some state-change functions require a relatively high level of voltage for proper operation. The pump 1010 can integrate with the voltage application component 108 of FIG. 1 to provide voltages for state-changes. A state machine 1012 provides logic functions to the flash memory device 1000. For example, some components only run during certain states and the state machine provides logic signals for those components.

A data flow control unit 1014 controls many major functions of the flash memory device 1000. Functions generally includes writes, reads and erases, as well as several of the functions performed by components of the subject specification. For example, the voltage application component 108 can integrate with the data flow control unit 1014 to allow for state changes. However, in another embodiment, the voltage application component can integrate with the pump 1010. In addition, other components, such as the sensor component 110 of FIG. 1 can integrate into the data flow control unit 1014 to determine errors for the flash memory device 1000.

Figure 11:
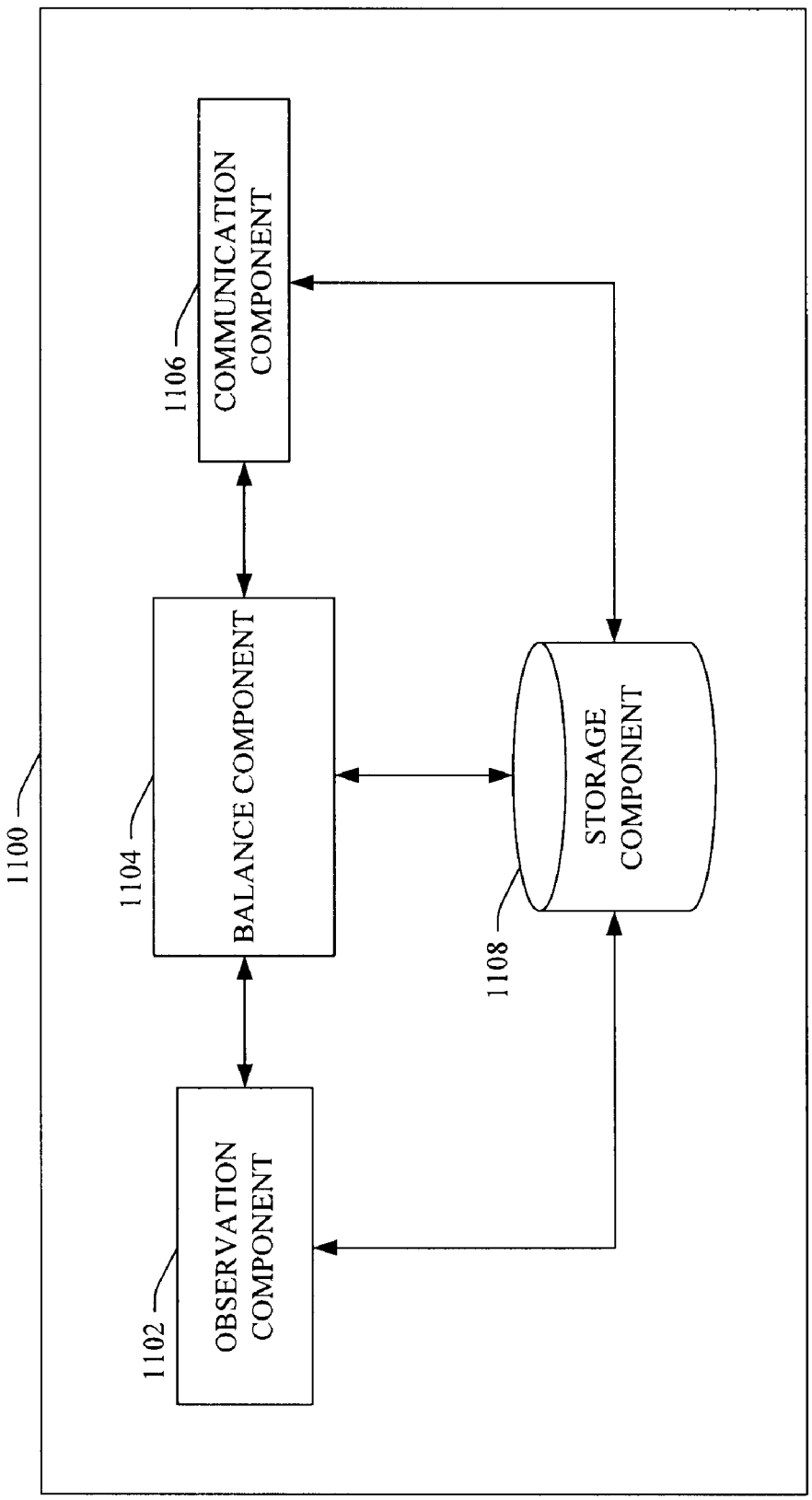
FIG. 11 illustrates a representative sensor component in accordance with an aspect of the subject specification.

FIG. 11 discloses an example sensor component 1100. The sensor component 1100 can represent sensor components disclosed in various parts of the subject specification. In addition, a reference to a component name applies to all components of that name (e.g., reference to a cell component shows that information applies to all cell components disclosed in the subject specification).

An observation component 1102 monitors a response of voltage application upon a cell component. Commonly, this takes place by observing current that application of voltage upon a cell component produces. A balance component 1104 regulates a voltage application component as to the response of the cell component from the voltage application. For example, the balance component 1104 sends information observed by the observation component 1102 to a voltage application component.

Information can include instructions that the voltage application component must follow and/or data upon which the voltage application component can choose to act. The balance component 1104 can send information by using a communication component 1106. The communication component 1106 can communicate through a variety of manners, including wireless communication.

In addition, the sensor component 1100 can include a storage component 1108. Information about the observation component 1102, balance component 1104, and/or communication component 1106 can be saved in the storage component 1108. Furthermore, intelligent decisions made by the sensor component 1100 can refer to the storage component 1108. For example, a current can change from one Amp to half of an Amp. The storage component 1108 can contain information about what a current change signifies. The balance component 1104 accesses contained information and can make a determination on how to regulate based on that information.

Figure 12:
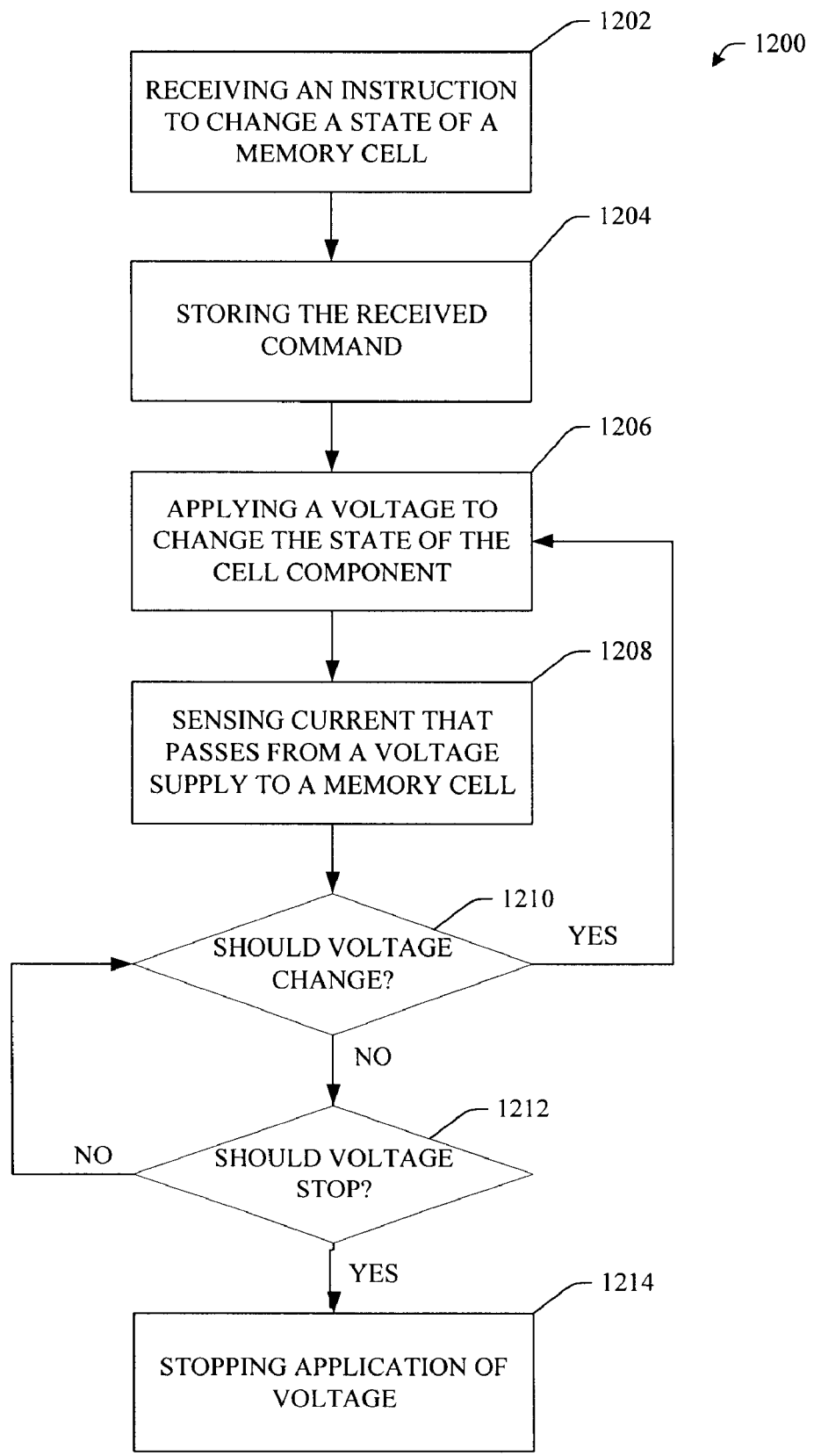
FIG. 12 illustrates a representative methodology in accordance with an aspect of the subject specification.

FIG. 12 discloses an example methodology 1200 in accordance with the subject specification. There is reception of an instruction to change a state of a cell component (e.g., memory cell) 1202. This reception is commonly received from auxiliary device with a user interface (e.g., cellular telephone). However, the instruction can originate from other locations. For example, an instruction can arise from internal components of a flash memory device. A copy of the command can be saved, commonly in internal storage 1204.

A voltage is applied to change the state of the cell component 1206. Action 1206 follows guidelines of the instruction received at event 1202. As the voltage is applied to the cell component to change the state 1206, there is sensing of current passing from a voltage supply to a cell component 1208. As the sensing takes place, two checks occur. The first check 1210 determines if an applied voltage level should change. The sensing of current 1208 can be configured to determine if there should be a voltage change based on the observed current. For example, the observed current can change from 0.5 Amp to 1 Amp. This change can signify that there should be a change in an applied voltage upon a cell component. If there needs to be a new voltage, then the methodology 1200 returns to action 1206.

A second check determines if voltage application should stop 1212. When a cell component reaches a desired state, further programming could render damage to the cell component. Therefore, the application should be stopped 1214. If the application should not be stopped, then the methodology 1200 returns to a check if the applied voltage should change 1210.

Figure 13A:
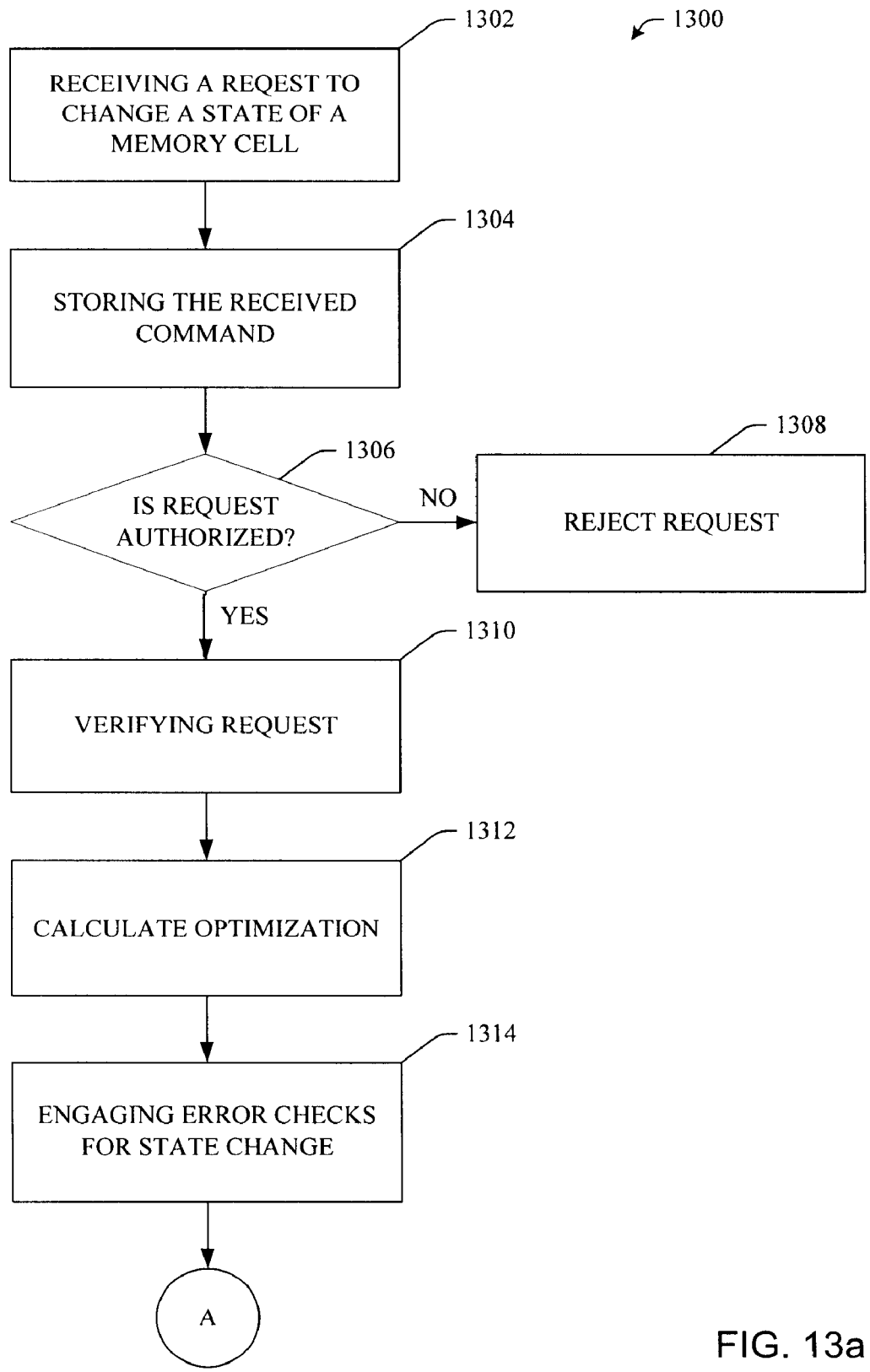
FIG. 13*a* illustrates a representative first part of a methodology in accordance with an aspect of the subject specification.
Figure 13B:
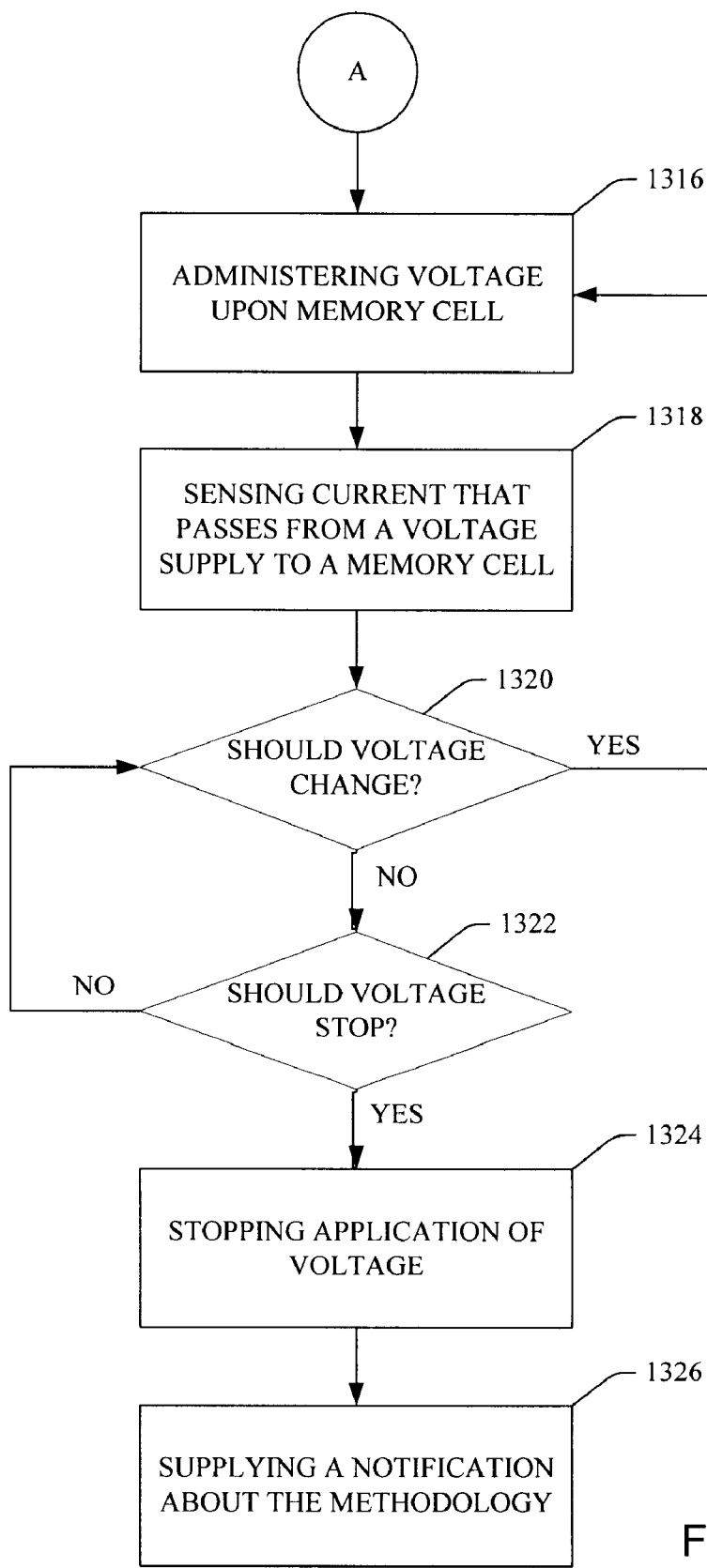
FIG. 13*b* illustrates a representative second part of a methodology in accordance with an aspect of the subject specification.

FIG. 13a and FIG. 13b disclose an example methodology 1300 in accordance with the subject specification. A request is received to change the state of a cell component (e.g., a memory cell) 1302 that can be stored in memory 1304. This is a request to administer a voltage upon a cell component. A check can take place to determine if a received request is authorized 1306. For example, the request can be to modify an academic grade file. Check 1306 can determine if the request is from a teacher or administrator. If the request came from an unauthorized source (e.g., a student), then there can be denial of the request to change 1308. Denial of the request 1308 or continuing with the methodology 1310 operating in accordance with a determined result.

If the request is authorized, then the methodology 1300 can verify the request 1310. For example, the request can be compared with similar requests to determine how the methodology should perform in later actions. Furthermore, verification allows for a check with a user. For example, if there is a request to change an academic grade file, a conformation request to verify can be produced. While not shown, the verification can act as a check. An unverified request can be denied.

A verified request can be optimized, which can entail calculating an optimization 1312. This allows the methodology 1300 to operate at an improved efficiency. For example, there can be a calculation of a cell component state and a comparison between a current state and a desired state. The optimization component can calculate a voltage that is expected to obtain the new state in the fastest time possible. There is engagement of error checks related to voltage administration upon the cell component 1314. This can entail identifying errors or attempting to fix errors related to a state change.

A voltage is administered to change the state of the cell component 1316. In common operation, action 1316 follows instruction received in action 1302 in conjunction with optimization characteristics calculated at event 1312. As there is administration of voltage to the cell component to change the state 1316, there is sensing of current passing from a voltage supply to a cell component 1318. 1318 is sensing an impact from a voltage administration upon a cell component.

As the sensing takes place, two checks occur. The first check 1320 determines if an applied voltage level should change. According to one embodiment of the subject specification, the change is to allow the methodology 1300 to operate faster. The sensing of current 1318 can be configured to determine if there should be a voltage change based on the observed current. For example, the observed current can change from two Amps to one Amp. An observed current change such as this can signify that there should be a change in an applied voltage upon a cell component. If there needs to be a new voltage, then the methodology 1300 returns to action 1316.

A second check determines if voltage application should stop 1322. When a cell component reaches a desired state, further programming could render damage to the cell component or destroy the cell component. Therefore, the application should be stopped 1324 if the state has successfully changed. The checks 1320 and 1322 show communication between sensing and voltage application. Therefore, these checks show sending information related to the impact from the voltage administration. In addition changing the voltage and/or stopping the voltage show implementing sent information. If the application should not be stopped, then the methodology 1300 returns to a check if the applied voltage should change 1320. Notification can be supplied concerning various actions disclosed in the methodology 1300.

What has been described above includes examples of the subject specification. It is, of course, not possible to describe every conceivable combination of components or methodologies for purposes of describing the subject specification, but one of ordinary skill in the art may recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a sensor component that tracks one or more respectively sensed amounts of current in real time during a state change operation associated with a cell component, and recognizes a difference between a voltage application relating to change of state associated with the cell component during the state change operation and a different voltage application relating to a verification associated with the state change operation, such that verification of state change relating to the state change operation occurs during the state change operation to facilitate real time regulation of voltage applied to the cell component to facilitate the state change during the state change operation;

the sensor component further comprising:
      an observation component that monitors a response associated with the voltage application upon the cell component; and a balance component that regulates a voltage application component to regulate the voltage applied based at least in part on the response of the cell component from the voltage application; and an optimization component that calculates efficiency information relating to one or more voltage applications, comprising the voltage application, upon the cell component.

2. The system of claim 1, further comprising an error check component that processes errors relating to one or more voltage applications, comprising the voltage application, upon the cell component.

3. The system of claim 1, further comprising a notification component that sends one or more messages about one or more voltage applications, comprising the voltage application, upon the cell component.

4. The system of claim 1, further comprising a check component that verifies information about one or more voltage applications, comprising the voltage application, to the cell component.

5. The system of claim 1, further comprising a receiving component that obtains a command to apply voltage to the cell component.

6. The system of claim 5, further comprising an authorization component that determines if an obtained command can be implemented.

7. The system of claim 1, further comprising a storage component that holds information relating to one or more voltage applications, comprising the voltage application, upon the cell component.

8. The system of claim 1, wherein the cell component is a memory cell.

9. A method, comprising:

sensing one or more impacts from voltage administration upon a cell component during a state change operation associated with a cell component;

tracking the sensed impacts in real time during the state change operation, wherein a difference between a voltage administration relating to state change associated with the cell component during the state change operation and a different voltage administration relating to a verification associated with the state change operation is recognized;

verifying state change in relation to the state change operation during the state change operation while the state change is being performed on the cell component to facilitate real time voltage control;

controlling the voltage administered during the state change operation in real time based at least in part on the sensed impacts; and calculating optimization data related to the voltage administration upon the cell component.

10. The method of claim 9, further comprising receiving a request to administer a voltage upon the cell component.

11. The method of claim 10, further comprising determining if the received request is authorized and operating in accordance with a determined result.

12. The method of claim 10, further comprising verifying the received request to determine accuracy of information contained in the received request.

13. The method of claim 9, further comprising storing information related to the voltage administration upon the cell component.

14. The method of claim 9, further comprising engaging error checks related to the voltage administration upon the cell component.

15. The method of claim 9, further comprising administering voltage upon the cell component.

16. The method of claim 9, further comprising implementing sent information related to the one or more impacts from the voltage administration.

17. The method of claim 9, further comprising supplying a notification about the voltage administration upon the cell component.

18. A system comprising:

means for observing voltage applications that change a state of a memory cell during a change of state operation;

means for tracking observed reactions of the memory cell to the voltage applications during the change of state operation, wherein a difference between a voltage application relating to change of state associated with the memory cell during the change of state operation and a different voltage application relating to a verification associated with the change of state operation is known;

means for verifying the change of state during the change of state operation while the change of state is being performed on the memory cell to facilitate real time voltage control associated with the change of state operation;

means for regulating the voltages applied during the change of state operation in real time based at least in part on the observed reactions; and means for calculating efficiency information relating to one or more voltage applications, comprising the voltage application, upon the memory cell.

* * * * *